(12) United States Patent
Ballinger et al.

(10) Patent No.: US 8,005,901 B2
(45) Date of Patent: Aug. 23, 2011

(54) MAPPING POLICIES TO MESSAGES

(75) Inventors: Keith W. Ballinger, North Bend, WA (US); Hervey O. Wilson, Bellevue, WA (US); Vick B. Mukherjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 974 days.

(21) Appl. No.: 10/891,946

(22) Filed: Jul. 14, 2004

(65) Prior Publication Data

US 2006/0015625 A1 Jan. 19, 2006

(51) Int. Cl.
G06F 15/16 (2006.01)

(52) U.S. Cl. ........ 709/206; 709/203; 709/223; 709/239; 709/227; 709/229; 726/1; 726/10; 726/26

(58) Field of Classification Search .................. 709/201, 709/205–207
See application file for complete search history.

(56) References Cited

U.S. PATENT DOCUMENTS

| | | | | |
|---|---|---|---|---|
| 6,061,692 A | | 5/2000 | Thomas et al. ............... | 707/200 |
| 6,085,100 A | * | 7/2000 | Tarnanen ...................... | 455/466 |
| 6,327,535 B1 | | 12/2001 | Evans et al. ................... | 701/300 |
| 6,484,150 B1 | | 11/2002 | Blinn et al. ..................... | 705/26 |
| 6,493,733 B1 | | 12/2002 | Pollack et al. ................ | 715/513 |
| 6,750,883 B1 | | 6/2004 | Parupudi et al. .............. | 345/763 |
| 2003/0061365 A1 | | 3/2003 | White et al. ................... | 709/229 |
| 2003/0212540 A1 | | 11/2003 | Meredith et al. ................ | 704/4 |
| 2003/0212671 A1 | | 11/2003 | Meredith et al. ................ | 707/3 |
| 2003/0212672 A1 | | 11/2003 | Meredith et al. ................ | 707/3 |
| 2004/0034770 A1 | | 2/2004 | Kaler et al. ................... | 713/155 |
| 2004/0060002 A1 | | 3/2004 | Lucovsky et al. ............. | 715/513 |
| 2004/0093515 A1 | | 5/2004 | Reeves .......................... | 713/201 |
| 2006/0136555 A1 | * | 6/2006 | Patrick et al. ................. | 709/203 |

OTHER PUBLICATIONS

Hanson, J. E., et al., "Conversation Support for Business Process Integration," Proceedings Sixth International Enterprise Distributed Object Computing Conference, Sep. 2002, pp. 65-74.
Suzuki, J., et al., "Biologically-Inspired Autonomous Adaptability in a Communication Endsystem: An Approach Using an Artificial Immune Network," IEICE Transactions on Information and Systems, vol. E84-D, Issue 12, Dec. 2001, pp. 1782-1789.
Yocum, K., et al., "Any Point Communication Protocol," Proceedings Eighth Workshop on Hot Topics in Operating Systems, May 2001, p. 189.
Mitchell, B., "Indigo, Web Services and Extreme Programming," "Benjaminm's Blog", May 21-Jun. 2, 2004, available at http://benjaminm.net/default.aspx?date=2004-06-02.
Mitchell, B., "Indigo, Web Services and Extreme Programming," Benjaminm's Blog, Jun. 7-30, 2004, available at http://benjaminm.net/default.aspx?date=2004-06-30.
Maine, S., "Brain.Save( )," Mar. 2-17, 2004, available at http://hyperthink.net/blog/default,date,2004-03-17.aspx.

(Continued)

*Primary Examiner* — Salad Abdullahi
*Assistant Examiner* — Hua Fan
(74) *Attorney, Agent, or Firm* — Workman Nydegger

(57) ABSTRACT

Within a distributed system, e.g., Web service environment, the present invention provides a way for identifying policies mapped to messages associated with an application, without having to have code within the application for determining what policies should apply to the messages. A centralized Web service engine is provided that receives incoming and outgoing messages associated with an application. The messages have associated with them destination endpoint identifiers and request-reply properties, which the Web service engine can access. The Web service engine can then use at least the identifiers and properties for scanning policy message files corresponding to the applications in order to identify what policies, if any, should be applied to the messages.

38 Claims, 4 Drawing Sheets

OTHER PUBLICATIONS

Wilson, H., "Security Context Token," Herveyw's Blog: Inside WSE, Jan. 21, 2004, available at http://www.dynamic-cast.com/mt-archives/000038.html.

Wilson, H., "Automatic Secure Conversation," Herveyw's Blag:WS-Secure Conversation Archives, Apr. 8, 2004, available at http://dynamic-cast.com/mt-archives/cat_wssecureconversation.html.

Atkinson, B., et al., "Web Services Security (WS-Security)," MSDN Library, Version 1.0, Apr. 5, 2002, available at http://msdn.microsoft.com/library/en-us/dnglobspec/html/ws-security.asp?frame=true.

Anderson, S., et al., "Web Services Trust Language (WS-Trust)," MSDN Library, Version 1.1, May 2004, available at http://msdn.microsoft.com/library/en-us/dnglobspec/html/ws-trust.asp?frame=true.

Anderson, S., et al., "Web Services Secure Conversation Language (WS-SecureConversation)," MSDN Library, Version 1.1, May 2004, available at http://msdn.microsoft.com/library/en-us/dnglobspec/html/ws-secureconversation.asp?frame=true.

Box, D., et al., "Web Services Policy Framework (WS-Policy)," Cover Pages, Version 1.1, May 28, 2003, available at http://xml.coverpages.org/ws-policyV11.pdf.

Box, D., et al., "Web Services Policy Attachment (WS-Policy Attachment)," Cover Pages, Version 1.1, May 28, 2004, available at http://xml.coverpages.org/ws-policyattachmentV11.pdf.

Box, D., et al., "Web Services Policy Assertions Language (WS-Policy Assertions)," MSDN Library, Version 1.1, May 28, 2003, available at http://xml.coverpages.org/ws-policyassertionsV11.pdf.

Powell, M., "Programming with Web Services Enhancements 2.0," MSDN Library, May 2004, available at http://msdn.microsoft.com/library/en-us/dnwse/html/programwse2.asp?frame=true.

* cited by examiner

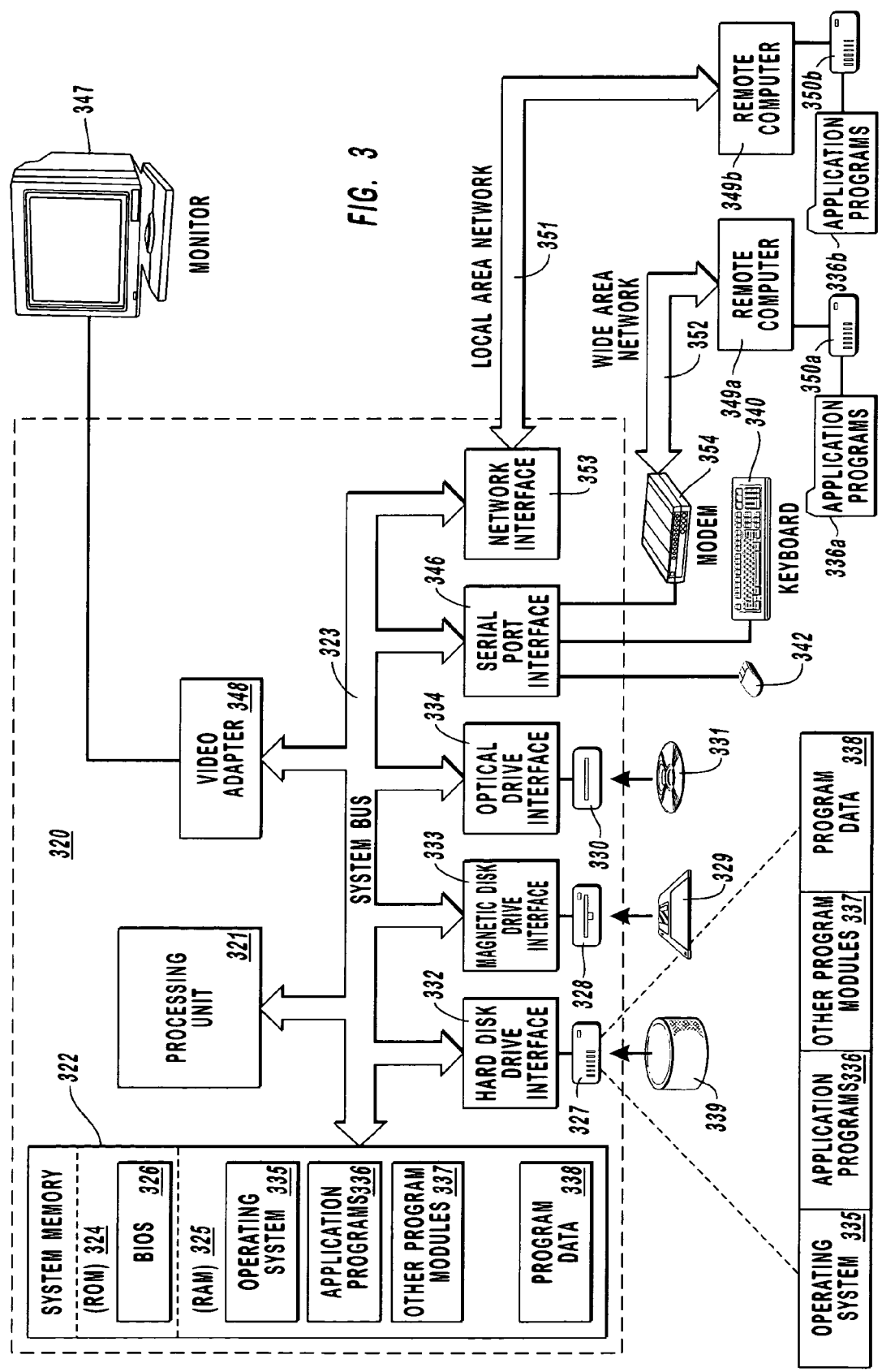

MAPPING POLICIES TO MESSAGES

CROSS-REFERENCE TO RELATED APPLICATIONS

N/A

BACKGROUND OF THE INVENTION

1. The Field of the Invention

The present invention generally relates to Web service policies in a distributed system. More particularly, the present invention provides for a policy mapping file that maps messages associated with an application to web service policies.

2. Background and Related Art

Computerized systems provide many advantages towards people's ability to perform tasks. To enable these advantages, computer systems often come equipped with (or are expandable to include) multiple hardware devices that can store or read data or enable a software program to perform a specific action on data. Such devices can include, e.g., a hard drive, a Compact Disk (i.e., CDROM, CDRW, ect.), a Universal Serial Bus (USB) devise (e.g., a printer, a scanner, ect.), and so on. Present computer systems also commonly have installed there on multiple software (or "applications") programs such as a word processing program, a spread sheet program, an imaging program, and an electronic mail program, which instruct the devices to perform specific actions on the data.

Businesses rely heavily on such computerized systems to manage and store information, which is the life blood of most businesses. From a customer relations management suite, or a payroll application to a manufacturing system, businesses increasing rely on such computerized technology to make better use of various types of information they depend on everyday. These systems typically "built to task, and built to last" perform well in isolation, accomplishing the specified task they were designed for. But true value comes from connecting systems together. For example, say you have a stand alone inventory system. If you don't connect it to anything else, it is not as valuable as it could be. The system can track inventory, but not much more. Inventory information may have to be entered separately in the accounting and costumer relation management systems. The inventory system may be unable to automatically place orders to suppliers. Accordingly, the benefits of such inventory system are diminished by high over head costs.

If, however, you were able to connect your inventory system to your accounting system such connection has the potential for getting more interesting. Now, whenever you buy or sell something, you potentially have the possibility of your inventory and your cash flow being tracked in one step. If you go further, and connect your warehouse management system, custom ordering systems, supplier ordering systems, and your shipping company, suddenly that inventory management system could be worth a lot more. You could then do end-to-end management of your business while dealing with each transaction only once, instead of once for every system it affects. A lot less work and a lot less opportunity for errors.

Until recently, however, custom integration was thought to be expensive, time-consuming and brittle. For example, because the sales data base and the accounting system are typically not designed to work with each other (i.e., because the data for each application is formatted and accessed according to the way the application program was formatted), connecting the two can be expensive and time-consuming. Accordingly, the potential benefits can be out weighed by such expense and time. Further, even if the systems were able to be integrated, making changes to either or possibly adding other systems could break the link, thereby causing more time and more money.

Web services, however, are turning the way we build and use software inside out. Web services let applications share data, and—more powerfully—invoke capabilities from other applications without regard to how those applications were built, what operating system or platform they run on, and what devices are used to access them. Although Web services remain independent of each other, they can loosely link themselves into a collaborating group that forms a particular task. Web services are invoked over the internet by means of industry-standard protocols including SOAP (Simple Open Access Protocol), eXtensible Markup Language (XML), and Universal Description, Discovery and Integration (UDDI), Web Service Description Language (WSDL), etc.

A key benefit of the emerging Web services architecture is the ability to deliver intergraded, interoperable solutions. Because, however, Web services provide various services from different businesses, organizations, and other service providers via the Internet, security issues are a main concern to protect the information that is transferred. Accordingly, Web service protocols have established security standards that describe enhancements to messaging protocols (e.g., SOAP messaging) to provide quality of protection through message integrity, message confidentiality, and single message authentication. For instance, there are mechanisms that can be used to accommodate a wide verity of security models and encryption technologies. Some Web service security protocols provide a general-purpose mechanism for associating security tokens with messages. Other Web service securities describe how to encode binary security tokens. Specifically, one specification describes how to encode X.509 certificates and Kerberos tickets as well as how to include opaque encrypted keys. This particular service also includes extensibility mechanisms that can be used to further describe the characteristics of the credentials that are included within a message.

By themselves, Web service securities do not ensure security nor do they provide a complete security solution. Web serve securities are building blocks that are used in conjunction with other Web services and application-specific protocols to accommodate a wide verity of security models and encryption technologies. For example, Web service securities are used in conjunction with Web service policies, which provide a flexible and extensible grammar for expressing capabilities, requirements, and general characteristics of entities in a Web service-based system.

Web service policies define a framework and a model for the expression of these properties as policies. Policy expressions allow for both simple and declarative assertions as well as more sophisticated conditional assertions. Further, some assertions specify traditional requirements and capabilities that will ultimately manifest on the wire (e.g., authentications scheme, transport protocol selection). Other assertions specify requirements and capabilities that have no wire manifestation yet are critical to proper service selection and usage (e.g., privacy policy, Quality of Service (QoS) characteristics). Nevertheless, Web service policies provide a single policy grammar to allow both kinds of assertions to be reasoned about in a constant manner.

In order to take advantage of the policy and security availabilities provided through Web services, application developers must typically write code within the application itself to access and implement these policy and security features. In addition, they must generate code to determine what policies, if any, apply to a particular type of message, associated with a particular application and destined for an endpoint. Having to create such code in an application, however, has several draw backs. For example, once compiled the defined policies become unchangeable within that particular application, and a new version of the application must be created if changes are desired. Further, if the specified policy and/or security features specified in the application are no longer supported, the application cannot be extended to support alternative updates—unless, of course, an updated version of the application is created. As such, there is neither flexibility nor ease in extending the system. Further, because such application developers are typically not experts in such policy issues, there are security concerns that come into play, as well as performance, stress and/or other robustness factors.

Accordingly, there exists a need for allowing a developer to declaratively state the desired policies in a flexible, extensible and robust manner. In order to do this, however, there also exists a need to allow developers to declaratively map the policies to the messages.

BRIEF SUMMARY OF THE INVENTION

The above-identified deficiencies and draw backs of the current Web service applications are over come by the present invention. For example, in a distributed computing system for exchanging messages, the present invention provides for identifying policies mapped to messages associated with an application, without having to have code within the application for determining what policies may apply to the messages.

Exemplary embodiments provide for receiving the message at Web service engine associated with an application that is external to the Web service engine, wherein the application is configured to exchange messages in a distributed system. Based on the contents of the received message, at least a destination endpoint identifier associated with the message is determined. Further, a policy mapping file is accessed that includes one or more endpoint sections. Each of the one or more endpoint sections includes one or more operation elements that indicate a type of interaction pattern for messages. Moreover, at least one of the one or more operation elements identify a policy expression with one or more policy assertions representing policies associated with exchanging messages with the application. Upon accessing the policy mapping file, the policy mapping file can be scanned for identifying an operation element corresponding to the destination endpoint identifier.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates an example system that provides a suitable operating environment for the present invention.

DETAILED DESCRIPTION OF THE PREFERRED EMBODIMENTS

The present invention extends to methods, systems and computer program products for mapping policy assertions to messages in a distributed Web service system. The embodiments of the present invention may comprise a special purpose or general-purpose computer including various computer hardware, as discussed in greater detail below.

The present invention provides for a Web service engine configured to assist applications in exchanging messages between endpoints of a Web service system. A Web service endpoint is an entity, processor, and/or resource where Web service messages can be targeted. Endpoint identifiers or references convey the information needed to identify/reference a Web service endpoint, and may be used in several different ways. For example, endpoint identifiers ar suitable for conveying the information needed for accessing a Web service endpoint. They are also used to provide addresses for individual messages sent to and from Web services. To deal with this last usage, the present invention provides exemplary embodiments of Web service addressing that define a family of message information headers that allows uniform addressing of messages independent of underlying transport. As will be described in greater detail below, these message information headers convey end-to-end message characteristics including addressing for source and destination endpoints as well as message identity.

Figure 1A:
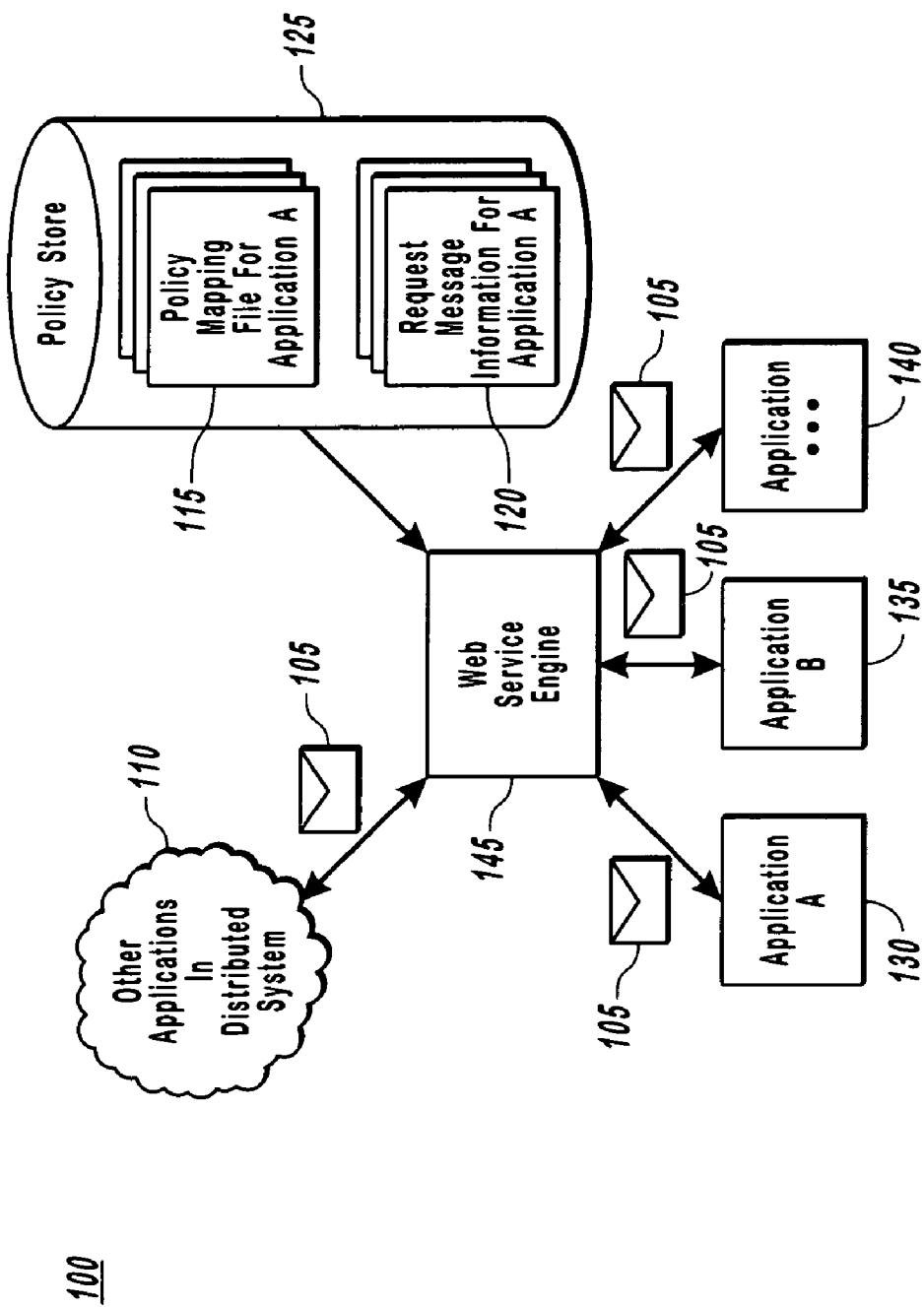
FIG. 1A illustrates a distributed system that utilizes a Web service engine in accordance with example embodiments of present invention.

A request-reply is a common interaction pattern that consists of an initial message sent by a source endpoint (the request) and subsequent message sent from the destination of the request back to the source (the reply). A reply can be an application message, a fault, or any other message. FIG. 1A shows an exemplary Web service system 100 in which request-reply messages 105 are exchanged between various endpoints. For example, exemplary embodiments provide for a centralized Web service engine 145 capable of assisting in communicating messages 105 between various applications or other endpoints within a distributed system 100. The Web service engine 145 assists applications within the distributed system 100 by controlling access to Web services policies, e.g., Web service security.

As shown in FIG. 1A applications (e.g., Application A 130, Application B 135, Applications " . . . " 140 and other applications in a distributed system 110) communicate messages 105 through the request-reply technique previously described above. The applications 130, 135, 140, 110, will typically reside on different systems and the messages can be transferred over the Internet using standard well known formats and protocols such as Hypertext Transfer Protocol (HTTP), Web Services Description Language (WSDL), Simple Object Access Protocol (SOAP), etc. Of course, the applications could reside on a network linked through other transport formats and protocols. As such, the use of the Internet and its protocols for transferring messages between applications in a distributed system 100 is used for illustrative purposes only, and is not meant to limit or otherwise narrow the scope of the present invention.

Other example embodiments allow for developers to created policy mapping files 115 for various applications and store them in a policy story 125 accessible by Web service engine 145. Policy mapping files 115 allow a developer to map policies to messages that correspond to a destined endpoint. The policies can be one or more policy expressions with one or more policy assertions representing policies associated with exchanging messages with the application. For example, the policy assertions may represent preferences, requirements, capabilities or other properties associated with exchanging messages with an application. Further, the policy assertions may be security policies that provide one or more of security token propagation, message integrity and message confidentiality through one or more of a signature, encryption, token, username/password credentials, etc.

Example embodiments provide that each message associated with an application (i.e., any incoming or outgoing message for an application, e.g., Application A 130, Application B 135 and/or any other number of applications, as represented by Applications " . . . " 140) is routed through the centralized Web service engine 145. As described in greater detail below, when a message is received by the Web service (it should be noted that "received" messages in this context should be construed broadly, especially in the claims, to encompass messages that are being sent from an application and those being received from other services—ie., incoming and outgoing messages) for a particular application (e.g., Application A 130), the Web service engine 145 will access the policy mapping file 115 associated with that application and determine what policy expressions, if any, apply to that message.

Figure 1B:
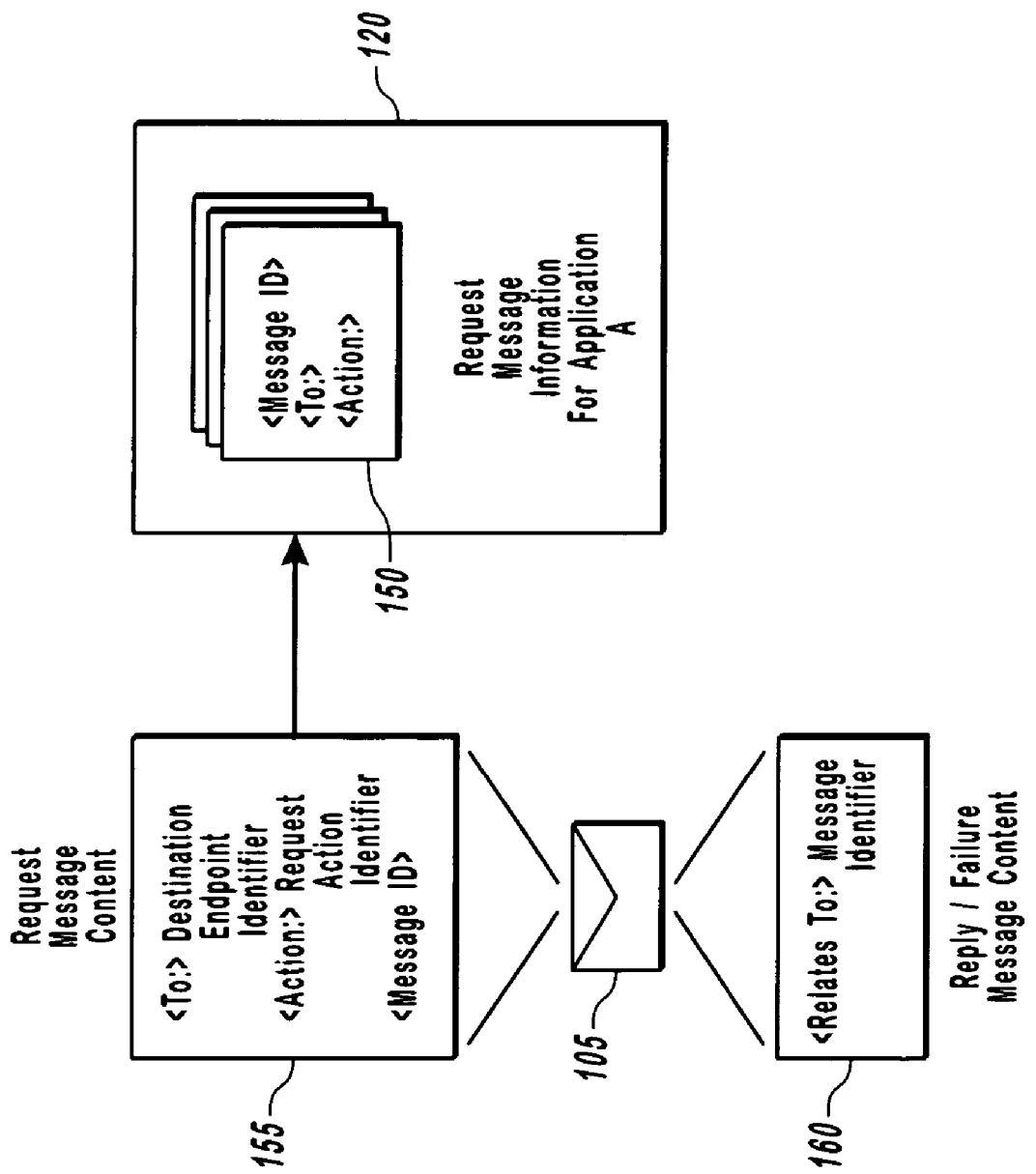
FIG. 1B illustrates send and receive message headers and an ability to identify request information for an application in accordance with example embodiments of the present invention.
Figure 1C:
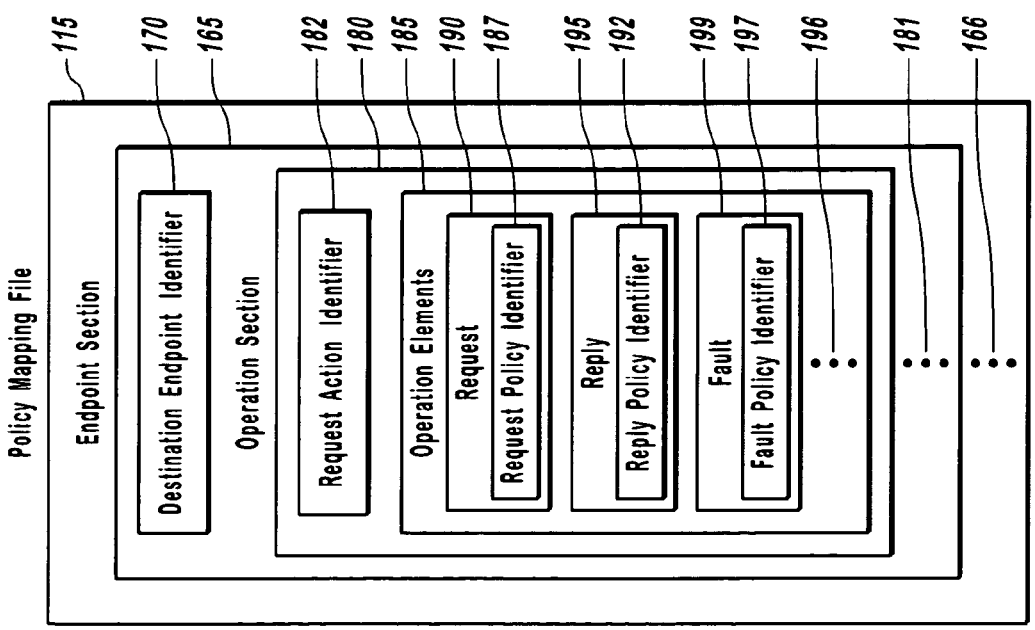
FIG. 1C illustrates a policy mapping file in accordance with example embodiments of the present invention.

FIG. 1C shows a policy mapping file 115 in accordance with example embodiments of present invention. Policy mapping file 115 contains several sections and identifiers used to reference or identify policy assertions representing policies associated with exchanging messages within the distributed system 100. As previously mentioned, each policy mapping file 115 corresponds to a particular application and can be written in, e.g., eXtensible Markup Language (XML). This provides the ability for developer to easily and continually update and modify the policy mapping file 115, thereby providing great flexibility, extendibility and robustness for a plurality of different applications.

Policy mapping file 115 includes an endpoint section 165; however, as indicated by the series of three vertical periods (hereinafter "vertical ellipsis") 166, there maybe several endpoint sections 165 within policy mapping file 115. Endpoint section 165 includes a destination endpoint identifier 170 which represents the name of a Web service destination that a particular policy expression is being mapped to. This destination endpoint identifier 170 maybe a name using a universal record identifier (URI), or any other suitable way for uniquely identifying the destined endpoint.

Policy mapping file 115 may also include a default endpoint section presenting a place holder for any endpoint that the system 100 can encounter for which an explicit endpoint section 165 is not provided. This default section, not shown, can include similar child elements (described above, and in greater detail below) as endpoint section 165. Exemplary embodiments provide that the mappings defined in an explicit endpoint section 165, i.e., those with a destination endpoint identifier 170, have precedence over the default endpoint section.

Within endpoint section 165, policy mapping file 115 may also include an operation section 180. As indicated by the vertical ellipsis 181, there maybe several operation sections 180 within policy mapping file 115. Operation section 180 may contain a request action identifier 182, which represents a specific Web service operation for an endpoint. Request action identifier 182 uniquely identifies or distinguishes operations by a request message's action, which relates to the semantics implied by the request message. The request action identifier may be a name, URI or any other way to uniquely identify the semantics implied by a request message. Of course, actions associated with other types of messages (e.g., reply, fault, etc.) could also be used for identifying the operation section. Accordingly, the use of the request action identifier for referencing the appropriate operation section is used for illustrative purposes only and is not meant to limit or otherwise narrow the scope of the present invention unless otherwise explicitly claimed.

Operation section 180 further includes operation elements for request 190, reply 195 and fault 199. Each operation element 190, 195, 199 represent the actual mapping between a specific message and its intended policy expression. Each operation element 190, 195, 199 references a particular policy or set of policy expressions by pointing to policy identifiers, e.g., request policy identifier 187, reply policy identifier 192, fault policy identifier 197. As will be appreciated, any number of policy identifiers can be included in an operation element. Further, as described in greater detail below, the policies referenced by the request policy identifier 187 in the request operation element 190 are applied to outgoing requests from the application or client to the server. Similarly, reply operation element 195 points to reply policies for replies to requests sent to the particular endpoint section/ operation section pair and the fault operation element 199 has policy identifiers 197 pointing to policies for fault messages, which are a specialization of reply messages (e.g., errors). As indicated by the vertical ellipsis 196, there may be other operation elements than those shown in the operation section 180. For example, the operation section may have a default element for all other operation elements not explicitly identified.

Endpoint section 165 can also include a default operation section (not shown), which represents a place holder for any Web service operation on the parent endpoint that the system can encounter for which an explicit operation section is not provided. The default section can contain the same child elements (e.g., request action identifier 182, operation elements 195, 195, 199) as any other operation section 180. Further, exemplary embodiments provide that the mapping defined within an explicit operation section 180 always has precedence over those defined with the default operation section.

Referring again to FIG. 1A, as previously mentioned, during the operation of the system 100, messages 105 flow in and out of Web service engine 145. The policy system, which may be part of Web service engine 145, is responsible for determining which policies must be verified for incoming messages 105 and which for outgoing messages 105. When a request message, for example message 155 shown in FIG. 1B, is being processed, the destination endpoint identifier and request action identifier, e.g., SOAP action, can be identified through the <To:> and <Action:> headers, respectively, specified in accordance with example Web service addressing techniques.

Using the destination endpoint identifier, request action identifier and a request-reply property (i.e., a property that identifies the type of message, in this instance a request) within a request message 155, the policy mapping file 115 can then be scanned to determine if a policy expression corresponds to the message. In particular, policy mapping file is first scanned to determine if an endpoint section 165 has a destination endpoint identifier 170 that matches the destination endpoint identifier in the <To:> header of request message 155.

If, however, no such destination endpoint identifier 170 exists within the policy mapping file 115 for the request message 155, the optional default endpoint section maybe used in its place. If either of these cases exist, then the appropriate endpoint section 165 (either express or default) is scanned to determine if an operation section 180 has a request action identifier 182 that matches the request action identifier in the <Action:> header. If, however, no such request action identifier 182 exists within the endpoint section 165 for the request message 155, the optional default operation section maybe used in its place. If either of these cases exist, then the appropriate operation section 180 (either express or default) is scanned to determine if a request operation element 190 or a default operation element (not shown) exists. If so, the request action identifier within the appropriate operation element 190 is used to map a policy expression to the message.

It should be recognized, however, that the present invention is not restricted to using the destination endpoint identifier, request action identifier and a request-reply property to determine if a message has a policy expression. For example, if the only operation section 180 and corresponding operation element 190, 195, 199 were a default operation section and default operation element for a specific endpoint section 165, then it doesn't matter what the request action identifier and request-reply property are. Every request action identifier and every request-reply property for messages corresponding to that endpoint section 165 will be evaluated according to the policies pointed to by the default operation element.

In fact, if the only sections and elements of the policy mapping file are default elements, then any message corresponding to the application for which the policy mapping file 115 corresponds would be evaluated according to the policies pointed to by the default operation element, and even the destination endpoint identifier would not need to be determined. Accordingly, the above use of the destination endpoint identifier, request action identifier and request-reply property to determine if a message has a policy expression is used for illustrative purposes only and is not meant to limit or otherwise narrow the scope of the present invention unless otherwise explicitly claimed.

Other example embodiments provide a slightly different way to determine what policies apply to messages 105 that are not request messages 155. Referring again to FIG. 1B, there is shown reply/failure message content 160 of message 105 in accordance with example embodiments for Web service addressing. (It should be noted that reply/failure message content 160 is representative of content for any message other than request messages content 155, and as such the term "reply/failure message content" should be interpreted broadly to encompass any type message other than request messages content 155.) By using a <Relates To:> header and message identifier associated with the header in the reply/failure message content 160, example embodiments allow for identifying or correlating information for a message 105 with request message content 155 to the reply/failure message content 160.

For example, part of the distributed system 100, e.g., the Web service engine 145, in FIG. 1A can keep track of the destination endpoint identifiers and request action identifiers for all income and outgoing request messages 105 (i.e., those messages with request message content 155) for each application. The information may be stored within a policy store 125 for each application 130, 135, 140, for subsequent retrieval and use. For instance, as shown in FIG. 1B, when a request message 105 with request message content 155 is received by Web service 145, information about request message content 155 can be stored in an application specific file, e.g., the file "request message information for application A" 120. The information stored may include, e.g., a message identifier associated with the request message content 155 and identified by the <Message ID>header, a destination endpoint identifier identified as described above by the <To:>header and a request action identifier as indicated by the <Action:>header.

When an incoming or outgoing message 105 received at Web service engine 145 contains a <Relates To:>header (thereby indicating that the message 105 includes reply/failure message content 160), the relates to message identifier may be used as a key to search the database or policy store 125 for the appropriate request message information, e.g., request message information for application A 120. Once the appropriate message information is determined, the corresponding request messages destination endpoint identifier and request action identifier can be used in a similar manner as that described above to look up any potential policy mappings. The main noted exception to the process for determining if a policy expression should be applied to the message 160 is that instead of using the request operating element 190 to identify the appropriate policy expression, a reply operation element 195 or fault operation element 199 element (or any other operation element other than a request operation element) will be used for identifying the appropriate policies. Of course, as with the request operation element 190, if no such reply operation element 195 or failure operation element 199, as the case may be, exists within the operation elements 185, the optional default operation element may be used in its place to identify the policies.

Other exemplary embodiments provide that if no operation elements, e.g., request policy identifier 190, rely policy identifier 195, fault policy identifier 199, are mapped to a message being processed then the system interprets this as meaning no policy is mapped to this message. Further, when attempting to enforce policies for a message, i.e., the message is an outgoing message, and the message cannot be processed in accordance with the appropriate corresponding property assertions, example embodiments provide for returning an error to the application.

It should be noted that there are other well known ways for correlating and identifying messages other than using the specific <Relates To:>, <To:>, and <Message ID> message headers. For example, certain types of messages (e.g., failure messages) have associated with the special actions. Accordingly, information within the actions header may be used to identify the type of message as well as other information. Further, message headers aren't specifically required in some transport protocols like HTTP, which embeds the notion of request/reply. As such, the use of <Relates To:>, <To:>, and <Message ID> headers to correlate and identify the types of messages and other information associated therewith is used for illustrative purposes only and is not meant to limit or otherwise narrow the scope of the present invention unless otherwise explicitly claimed.

The following illustrates an example policy mapping file 115 as expressed in XML (a hierarchical schema language). The following file and the description thereof are used to illustrate how the different sections can be related through the use of XML. It should be noted, however, that other formats and languages can be used to implement the present invention. Accordingly, the following example of a policy mapping file 115 is used for illustrative purposes only and is not meant to limit or otherwise narrow the scope of the present invention unless otherwise explicitly claimed.

ingly, messages that are mapped to this operation section are mapped to the Kerberos-sign policy if they are a request or mapped to the x509-sign policy if they are a reply. All other type messages are not subject to any policy, as indicated by the default operation element. Accordingly, when messages that correspond to this first operation section are received by a Web service engine, the appropriate policies associated with the messages can be accessed and implement, without the corresponding application having any code to determine the appropriate policy to apply, if any.

Lines 9 and 10 end the first operation section for the first endpoint and begin the second operation section, respectively. As shown, the second operation section is a default

```
Line 1:   <?xml version="1.0" encoding="utf-8" ?>
Line 2:   -<policyDocument xmlns=http://schemas.company.com/wse/2003/06/Policy>
Line 3:       -<mappings>
Line 4:           -<endpoint uri=http://test/uri>
Line 5:           -<operation requestAction="TestAction">
Line 6:               <request policy="#kerberos-sign"/>
Line 7:               <reply policy="#x509-sign:/>
Line 8:               <default policy=""/>
Line 9:           </operation>
Line 10:          -<defaultOperation>
Line 11:              <request policy="#sct-sign #sct-encrypt"/>
Line 12:              <reply policy="#sct-sign #sct-encrypt"/>
Line 13:              <fault policy=""/>
Line 14:          </defaultOperation>
Line 15:      </endpoint>
Line 16:      -<defaultEndpoint>
Line 17:          -<defaultOperation>
Line 18:              <request policy="#kerberos-sign"/>
Line 19:              <reply policy="#kerberos-sign"/>
Line 20:              <fault policy=""/>
Line 21:          </defaultOperation>
Line 22:      </defaultEndpoint>
Line 23:   </mappings>
Line 24: </policyDocument>
```

The above XML example represents a policy document that includes a policy mapping file. Line 1 identifies the document as an XML file. The XML policy document is embedded between Lines 2-24, which includes the XML policy mapping file as shown between Lines 3-23. It should be noted that the XML policy document may include other elements other than just the XML policy mapping file, e.g., a XML policy file. Accordingly, the above XML policy document is used for illustrative purposes only.

As shown above, the XML policy mapping file includes two endpoint sections, although as previously mentioned any number of endpoint sections are available. The first endpoint section includes a destination endpoint identifier URI of "http://test/uri" as shown in Line 4. Accordingly, any messages associated with this URI (as previously described) are mapped to this specific section.

The first endpoint section also includes two operation sections, but again example embodiments provide for any number of operation sections. The first operation section is specifically provided for by the request action identifier "TestAction" as shown in Line 5. Accordingly, any message mapped to this specific URI section that is associated with (e.g., request, reply, fail, etc. message) the TestAction identifier for the <Action:> header is mapped to this operation section.

As shown in Lines 6-8, this operation section includes three specified operation elements. Specifically, this operation section includes request, reply and default operation elements, each of which point to policy expressions, except for the default operation element which is a nothing. Accordoperation section for the first endpoint section within the XML mappings file. As such, all other messages that are mapped to the URI for this section will be mapped to this default operation section. Similar to the first operation section above, the default operation section includes three operation elements of request, reply and fault, as shown in Lines 11-12.

This time, however, the request and reply operation elements each point to two policies: "set-sign" and "sct-encrypt." Accordingly, messages of this type in this operation section will be mapped to both policies. All fault messages mapped to this operation section are not mapped or subject to any policy. Accordingly, when messages that correspond to this default operation section for the first endpoint section are received by a Web service engine, the appropriate policies associated with the messages can be accessed and implemented, without the corresponding application having any code to determine the appropriate policy to apply, if any.

Lines 15 and 14 end the first section and default operation for the first section respectfully. As indicated in Line 16, the second endpoint section for the XML policy mapping file is a default endpoint section. Accordingly, all messages not associated with the destination endpoint identifier http://test/uri are mapped to this section. This default endpoint section includes only one operation section, which as indicated in Line 17 is a default operation sections. As such, all messages not associated with the destination endpoint identifier URI of the first endpoint section, regardless of their request action identifier, will be mapped to this operation section.

As shown in Lines 18-19, the default operation section includes three operation elements of request, reply and fault, respectively. Messages corresponding to request or replay operation elements are mapped to the Kerberos-sign policy, whereas fault messages are not mapped to a policy. Accordingly, when messages that correspond to this endpoint section are received by a Web service engine, the appropriate policies associated with the messages can be accessed and implement, without the corresponding application having any code to determine the appropriate policy to apply, if any. Finally, Lines 21-24, close the default operation section, default endpoint section, the XML mapping file and the XML policy document, respectively.

The present invention may also be described in terms of methods comprising functional steps and/or non-functional acts. The following is a description of steps and acts that may be performed in practicing the present invention. Usually, functional steps describe the invention in terms of results that are accomplished, whereas non-functional acts describe more specific actions for achieving a particular result. Although the functional steps and non-functional acts may be described or claimed in any particular order, the present invention is not necessarily limited to any particular order or combination of acts and/or steps. Further, the use of acts and/or steps in the recitation of the claims and in the following description of the flow chart for FIG. 2 are used to indicate the desired specific use of such terms.

Figure 2:
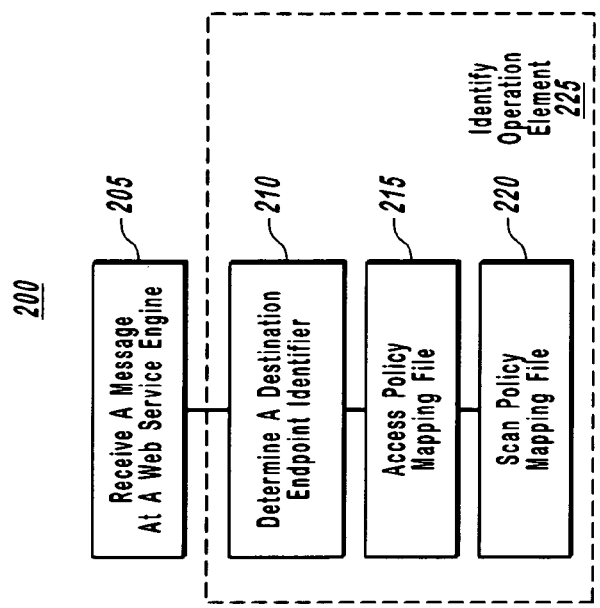
FIG. 2 illustrates a flow chart of a method of identifying policies mapped to messages in accordance with example embodiments.

FIG. 2 illustrates an example flow chart for various exemplary embodiments of the present invention. This following description of FIG. 2 will occasionally refer to corresponding elements from FIGS. 1A-C. Although reference maybe made to a specific element from these Figures, such elements are used for illustrated purposes only and it are not meant to limit or otherwise narrow the scope of the present invention unless otherwise explicitly claimed.

FIG. 2 illustrates an example flow chart of a method of identifying policies mapped to messages associated with an application, without having code within the application for determining what policies should apply to the messages. Method 200 includes an act of receiving 205 a message at a Web service engine. For example, Web service engine 145 may receive a message associated with an application 130, 135, 140 or other applications 110 in distributed system 100 and where the applications are external to the Web service engine 145. Further, the application is configured to exchange messages in a distributed system 100.

Method 200 may also include a step for identifying 225 an operational element. For example, Web service engine 145 maybe used to identify an operation element based on the contents of the received message 105. Step 225 may include any corresponding acts; however, in FIG. 2 step 225 includes an act of determining 210 a destination endpoint identifier. For instance, Web service engine 145 may access the received message 105 and obtain information associated with message to determine at least the destination endpoint identifier. For messages 105 with request messages content 155, this information may be provided by the <To:> header. For messages 105 with reply/failure message content 160, the message identifier in the <Relates To:> header may be used to determine the destination endpoint identifier in accordance with techniques previously described.

Based on the contents of the message 105, other information associated with the destination endpoint identifier and message type may be determined. For instance, a request action identifier and request-reply property associated with the message 105 may also be determined. If the request-reply property is a reply or failure, example embodiments provided that a message identifier may be retrieved from the message and used to retrieve the destination endpoint identifier and request action identifier from a store 125.

Further, the step for identifying 225 includes an act of accessing 215 a policy mapping file. For example, Web service engine 145 may access policy mapping file 115, which includes one or more endpoint sections. Each of the one or more endpoint sections 165 may include one or more operation sections 180 with one or more operation elements 190, 195, 199 that indicate a type of interaction pattern for messages. For example, the operation elements maybe one of a request, reply, fault, or other message type. Moreover at least one of the one or more operation elements 190, 195, 199 identifies 187, 192, 197 a policy expression with one or more policy assertions representing polices associated with exchanging messages with the application.

The step for identifying 225 also includes an act of scanning 220 policy mapping file. For example, Web service engine 145 may scan policy mapping file 115 for identifying an operation element corresponding to the destination endpoint identifier. For instance, the destination endpoint identifier may be used for identifying an endpoint section associated with the message from about the one or more endpoint sections 165 within the policy mapping file 115. The request action identifier may then be used for identifying an operation section associated with the message from among the one or more operation sections 180 within the determined endpoint section 165.

The request-reply property may then be used for identifying the operation element associated with the message from among the one or more operation elements 190, 195, 199 within the determined operation section 180. One or more of the identifier endpoint section 165, the identified operation section 180 or the identified operation element 190, 195, 199 may be a default endpoint section 165, default operation section 180 or default operation element 190, 195, 199, respectively. Further the destination endpoint identifier and the request action identifier may be URIs. Moreover the request-reply property may be one of a request, reply or failure.

Other example embodiments provided for determining if the message 105 is either outgoing or incoming from the application. Based on the determination, embodiments provide for validating or enforcing the one or more policy expressions corresponding to the determined operation element 190, 195, 199. Other embodiments provide that if the received message 105 is outgoing and the message cannot be processed according to one or more policy assertions for the identifier operation element 190, 195, 199, then an error may be returned to the application. Of course, the operation element may be a nothing, and therefore not identify a policy expression with one or more policy assertions.

Still other embodiments provide that the policy assertions may represent preferences, requirements, capabilities or other properties associated with exchanging messages 105 with the application. For instance, the policy assertions may be security policies that provide one or more of security toke propagation, message integrity and message confidentiality through one or more of a signature, encryption, token and username/password credentials.

Still other embodiments provide that the Web service engine may receive message, validate and enforce policies for a plurality of applications. Further, the policy mapping file may be XML document.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise storage media such as RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable communication medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 3 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 3, an exemplary system for implementing the invention includes a general purpose computing device in the form of a conventional computer 320, including a processing unit 321, a system memory 322, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326, containing the basic routines that help transfer information between elements within the computer 320, such as during start-up, may be stored in ROM 324.

The computer 320 may also include a magnetic hard disk drive 327 for reading from and writing to a magnetic hard disk 339, a magnetic disk drive 328 for reading from or writing to a removable magnetic disk 329, and an optical disk drive 330 for reading from or writing to removable optical disk 331 such as a CD-ROM or other optical media. The magnetic hard disk drive 327, magnetic disk drive 328, and optical disk drive 330 are connected to the system bus 323 by a hard disk drive interface 332, a magnetic disk drive-interface 333, and an optical drive interface 334, respectively. The drives and their associated computer-readable media provide nonvolatile storage of computer-executable instructions, data structures, program modules and other data for the computer 320. Although the exemplary environment described herein employs a magnetic hard disk 339, a removable magnetic disk 329 and a removable optical disk 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disk 331, ROM 324 or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349a and 349b. Remote computers 349a and 349b may each be another personal computer, a server, a router, a network PC, a peer device or other common network node, and typically include many or all of the elements described above relative to the computer 320, although only memory storage devices 350a and 350b and their associated application programs 336a and 336b have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354, a wireless link, or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a Web services environment for exchanging messages in a distributed system, a method of identifying policies mapped to messages associated with an application, without having to have code within the application for determining what policies may apply to the messages, the method comprising the acts of:

receiving a message at a Web service engine associated with an application that is external to the Web service engine, the application configured to exchange messages in a distributed system;

based on the contents of the received message, determining at least:

a particular destination endpoint identifier related to the received message, wherein the particular destination endpoint identifier includes at least an address of a destination endpoint for the message;

a particular request action identifier; and a particular request-reply property related to the received message;

accessing a policy mapping file that includes:

at least one endpoint section, wherein each of the at least one endpoint sections are related to a different destination endpoint identifier;

at least one operation section, wherein each of the at least one operation sections is hierarchically within one of the at least one endpoint sections, wherein each of the at least one operation sections is related to a different operation and is represented by a corresponding different request action identifier; and at least one operation element, wherein each of the at least one operation elements is hierarchically within one of the at least one operation sections, wherein each of the at least one operation elements is related to a different request-reply property, and wherein each of the at least one operation elements indicates a type of interaction pattern for messages, wherein one or more of the at least one operation elements identifies one or more policy expressions with one or more policy assertions representing policies associated with exchanging messages with the application;

scanning the policy mapping file for identifying an endpoint section relating to the address of the particular destination endpoint identifier, the scanning being performed by a processing unit of a computing device;

after identifying the endpoint section relating to the particular destination endpoint identifier, scanning the identified endpoint section for identifying an operation section hierarchically within the identified endpoint section and which is represented by the particular request action identifier; and after identifying the operation section represented by the particular request action identifier, scanning the identified operation section for an operation element hierarchically within the identified operation section and which relates to the particular request-reply property, such that the identified operation element relates to, and is dependent upon, each of the address of the particular destination endpoint identifier, the particular request action identifier, and the particular request-reply property.

2. The method of claim 1, wherein the at least one endpoint sections of the mapping file include a plurality of endpoint sections of the mapping file, each of the plurality of endpoint sections relating to a different destination endpoint address.

3. The method of claim 2, further comprising the acts of:
determining that the particular request-reply property is a reply or failure;
retrieving from the message a message identifier; and
using the message identifier to retrieve the particular destination endpoint identifier and the particular request action identifier from a store.

4. The method of claim 2, wherein the identified endpoint section, the identified operation section, or the identified operation element is a default endpoint section, default operation section or default operation element, respectively.

5. The method of claim 2, wherein the particular destination endpoint identifier and the particular request action identifier are URIs.

6. The method of claim 2, wherein the particular request-reply property is one of a request, reply or failure.

7. The method of claim 1, further comprising the act of:
determining whether the message is either outgoing or incoming from the application; and
based on the determination, validating or enforcing one or more policy expressions relating to the determined operation element.

8. The method of claim 1, wherein the policy assertions represent preferences, requirements, capabilities or other properties associated with exchanging messages with the application.

9. The method of claim 8, wherein the policy assertions are security policies that provide one or more of security token propagation, message integrity and message confidentiality through one or more of a signature, encryption, token, and username/password credentials.

10. The method of claim 1, wherein the Web service engine receives messages, validates and enforces policies for a plurality of applications.

11. The method of claim 1, wherein the policy mapping file is an eXtensible Markup Language (XML) document.

12. The method of claim 1, wherein the received message is an outgoing message from the application, and wherein the message cannot be processed according to one or more policy assertions for the identified operation element, and wherein an error is returned to the application.

13. The method of claim 1, wherein the operation element does not identify a policy expression with one or more policy assertions.

14. In a Web services environment for exchanging messages in a distributed system, a method of identifying policies mapped to messages associated with an application, without having code within the application for determining what policies may apply to the messages, the method comprising:

receiving a message at a Web service engine associated with an application that is external to the Web service engine, the application configured to exchange messages in a distributed system;

based on the contents of the received message, determining at least:

a particular destination endpoint identifier relating to the received message, wherein the particular destination endpoint identifier includes a URI of a destination endpoint for the message;

a particular request action identifier associated with the received message and associated with a particular operation requested in the received message; and a particular request-reply property associated with the received message and associated with a particular type of message;

accessing a policy mapping file that includes:
- at least one endpoint section, wherein each of the at least one endpoint sections are related to a different URI;
- at least one operation section, wherein each of the at least one operation sections is hierarchically within the at least one endpoint section, and wherein each of the at least one operation sections is related to a different operation; and
- at least one operation element, wherein each of the at least one operation elements is hierarchically within the at least one operation section, wherein each of the at least one operation elements is related to a different request-reply property, and wherein each operation element indicates a type of interaction pattern for messages, wherein one or more of the at least one operation elements identifies one or more policy expressions with one or more policy assertions representing policies associated with exchanging messages with the application;

scanning the policy mapping file for identifying an endpoint section relating to the URI of the particular destination endpoint identifier, the scanning being performed by a processing unit of a computing device;

after identifying the endpoint section relating to the particular destination endpoint identifier, scanning the identified endpoint section for identifying an operation section hierarchically within the identified endpoint section and which is represented by the particular request action identifier; and after identifying the operation section represented by the particular request action identifier, scanning the identified operation section for an operation element hierarchically within the identified operation section and which relates to the particular request-reply property, such that the identified operation element relates to, and is dependent upon, each of the URI of the particular destination endpoint identifier, the particular request action identifier, and the particular request-reply property.

15. The method of claim 14, wherein the at least one endpoint sections of the mapping file include a plurality of endpoint sections, each of the plurality of endpoint sections relating to a different endpoint address.

16. The method of claim 15, further comprising the acts of:
determining that the particular request-reply property is a reply or failure;
retrieving from the message a message identifier; and
using the message identifier to retrieve the particular destination endpoint identifier and that particular request action identifier from a store.

17. The method of claim 15, wherein the particular destination endpoint identifier and the particular request action identifier are URIs.

18. The method of claim 14, further comprising the acts of:
determining whether the message is either outgoing or incoming from the application; and
based on the determination, validating or enforcing one or more policy expressions relating to the identified operation element.

19. The method of claim 14, wherein the policy assertions represent preferences, requirements, capabilities or other properties associated with exchanging messages with the application.

20. The method of claim 19, wherein the policy assertions are security policies that provide one or more of security token propagation, message integrity and message confidentiality through one or more of a signature, encryption, token, and username/password credentials.

21. The method of claim 14, wherein the Web service engine receives messages, validates and enforces policies for a plurality of applications.

22. The method of claim 14, wherein the policy mapping file is an eXtensible Markup Language (XML) document created.

23. The method of claim 14, wherein the particular request-reply property relating to the message is one of a request, reply or failure.

24. The method of claim 1, wherein the identified operation element is a default operation element.

25. The method of claim 1, wherein the received message is an outgoing message from the application, and wherein the message cannot be processed according to one or more policy assertions for the determined operation element, and wherein an error is returned to the application.

26. In a Web services environment for exchanging messages in a distributed system, a computer program product for implementing a method of identifying policies mapped to messages associated with an application, without having to have code within the application for determining what policies may apply to the messages, the computer program product comprising one or more computer storage devices having stored thereon computer executable instructions that, when executed by a processor, can cause the distributed computing system to perform the following:

receive a message at a Web service engine associated with an application that is external to the Web service engine, the application configured to exchange messages in a distributed system;

based on the contents of the received message, determine at least:
- a particular destination endpoint identifier relating to the received message, wherein the particular destination endpoint identifier includes at least an address of a destination endpoint for the message;
- a particular request action identifier associated with the received message; and
- a particular request-reply property associated with the received message;

access a policy mapping file that includes:
- at least one endpoint section, wherein each of the at least one endpoint sections is represented by a different destination endpoint identifier;
- a plurality of operation sections, wherein each of the plurality of operation sections is hierarchically within the at least one endpoint section, and wherein each of the plurality of operation sections represents a different operation; and
- at least one operation element hierarchically within each of the plurality of operation sections, wherein each of the at least one operation elements is represented by a different request-reply property, and wherein each operation element indicates a type of interaction pattern for messages, wherein one or more of the at least one operation elements identifies a policy expression with one or more policy assertions representing policies associated with exchanging messages with the application;

scan the policy mapping file for identifying an endpoint section relating to the address in the particular destination endpoint identifier;

after identifying the endpoint section relating to the particular destination endpoint identifier, scan the identified endpoint section for identifying an operation section represented by the particular request action identifier, which identified operation section is hierarchically within the identified endpoint section; and after identifying the operation section represented by the particular request action identifier, scan the identified operation section for identifying an operation element relating to the particular request-reply property, which identified operation element is hierarchically within the identified operation section and is such that the identified operation element relates to, and is dependent upon, each of the address of the particular destination endpoint identifier, the particular request action identifier, and the particular request-reply property.

27. The computer program product of claim 26, wherein the at least one endpoint sections of the mapping file include a plurality of endpoint sections of the mapping file, each of the plurality of endpoint sections relating to a different destination endpoint address.

28. The computer program product of claim 27, further comprising computer executable instructions that can cause the distributed computing system to perform the following:
   determine that the particular request-reply property is a reply or failure;
   retrieve from the message a message identifier; and
   use the message identifier to retrieve the particular destination endpoint identifier and the particular request action identifier from a store.

29. The computer program product of claim 27, wherein the identified endpoint section, the identified operation section or the identified operation element is a default endpoint section, default operation section or default operation element, respectively.

30. The computer program product of claim 27, wherein the particular destination endpoint identifier and request action identifier are URIs.

31. The computer program product of claim 27, wherein the particular request-reply property relating to the message is one of a request, reply or failure.

32. The method of claim 26, wherein the operation element does not identify a policy expression with one or more policy assertions.

33. The computer program product of claim 26, further comprising computer executable instructions that can cause the distributed computing system to perform the following:
   deteimine if the message is either outgoing or incoming from the application; and
   based on the determination, validate or enforcing one or more policy expressions relating to the determined operation element.

34. The computer program product of claim 26, wherein the policy assertions represent preferences, requirements, capabilities or other properties associated with exchanging messages with the application.

35. The computer program product of claim 34, wherein the policy assertions are security policies that provide one or more of security token propagation, message integrity and message confidentiality through one or more of a signature, encryption, token, and username/password credentials.

36. The computer program product of claim 26, wherein the Web service engine receives messages, validates and enforces policies for a plurality of applications.

37. The computer program product of claim 26, wherein the policy mapping file is an eXtensible Markup Language (XML) document.

38. The computer program product of claim 37, wherein the XML policy mapping file has at least the following structure:
   at a first line, an identification of the policy mapping file as an XML document; and
   at a line immediately subsequent to the first line, the XML policy document is embedded, wherein the XML policy document includes:
     at least two endpoint sections, wherein a first of the at least two endpoint sections includes a destination endpoint identifier URI and two operation sections, wherein a first of the two operation sections includes three operation elements, including at least a request operation mapped to a Kerberos-sign policy, a reply operation mapped to an x509-sign policy, and a default operation element for all messages nut subject to the request operation or the reply operation, and wherein a second of the two operation sections includes at least a failure operation element.

* * * * *